Patented Oct. 20, 1953

2,656,341

UNITED STATES PATENT OFFICE 2,656,341

CATALYTIC POLYMERIZATION PROCESS

Gaetano F. D'Alelio, Pittsburgh, Pa., assignor to Koppers Company, Inc., a corporation of Delaware No Drawing. Application September 28, 1948, Serial No. 51,635

9 Claims. (Cl. 260—88.7)

This invention relates to a process for the polymerization of acrylonitrile and methacrylonitrile. More specifically, it relates to a process using a new catalyst-combination for the polymerization of acrylonitrile and methacrylonitrile.

Polymers of these compounds having substantial amounts of residual monomer and low-molecular-weight polymers therein usually have certain undesirable properties, such as high-shrinkage in boiling water, low resistance to heat-distortion, potential discoloration due to oxidation of monomers, and crazing due to escape of volatile or fugitive materials. For these reasons, there is considerable interest in producing monomer-free polymers of acrylonitrile and methacrylonitrile. In addition, it is desirable to have a consistent and easily-controllable method for producing such polymers having high average molecular weights.

It has now been found that improvements in the polymerization of acrylonitrile and methacrylonitrile can be obtained by employing in the polymerization of these compounds a catalyst-combination consisting of a benzoyl peroxide and at least one other organic peroxy compound of the class consisting of tertiary-butyl perbenzoate, di-tertiary-butyl diperphthalate and 2,2-di-(tertiary-butyl-peroxy)-butane, and heating at a temperature between about 25° C. and about 80° C. until at least about 60 percent conversion of monomer to polymer has been effected, and then heating at a temperature between about 85° C. and about 125° C. until substantially complete polymerization has been effected.

The term "a benzoyl peroxide" is intended to include benzoyl peroxide and those derivatives of benzoyl peroxide having one or more chloro, bromo, fluoro, alkoxy (i. e., methoxy, ethoxy, propoxy and butoxy), alkyl (i. e., methyl, ethyl, propyl and butyl), benzo, or carboperoxy groups attached to the aromatic nucleus. Such substituents may be attached to either or both of the aromatic nuclei of the benzoyl peroxide. This class includes such peroxides as chlorobenzoyl, bromobenzoyl, fluorobenzoyl, alkoxy-benzoyl, alkyl-benzoyl, phthaloyl and naphthoyl peroxides.

The use of mixtures of organic peroxy compounds as polymerization catalysts is not new in itself. "Trigger-systems" have been known wherein a small amount of a strongly active peroxide, such as cyclohexyl hydroperoxide, sets off a slow peroxide, such as tertiary-butyl hydroperoxide. Such systems permit the use of an otherwise slow catalyst to give the desired degree of polymerization or cure in a short time without the increase in peak temperature or exotherm otherwise necessary. More recent disclosures have shown the use of a mixture of a relatively heat-sensitive organic peroxide, such as benzoyl peroxide, with certain relatively heat-stable peroxides, such as tertiary-butyl hydroperoxide, di-tertiary-butyl peroxide, 1-hydroxy-cyclohexyl-hydroperoxide-1, etc., first at a temperature below 75° C. and then above 120° C. The prior art catalyst-combinations have not been found suitable for the purposes of the present invention.

The decomposition characteristics or free-radical formation of a particular peroxy compound are usually somewhat dependent on its surroundings, i. e., on the monomer or other peroxy compound admixed with it. For example, the decomposition temperature of a peroxy compound by itself may be quite different from that exhibited under the influence of a monomer or other peroxy compound. Moreover, these characteristics may be varied by the type of monomer or peroxy compound. Furthermore, the selection of peroxy compounds to use in combination with a particular peroxide, such as benzoyl peroxide, may often be dependent on the type of polymerization system to be used. It has now been found, however, that the particular catalyst-combinations of this invention operate very satisfactorily and may be used in the improved process of this invention.

The effective proportions of catalysts in the catalyst-combinations and effective proportions of catalyst-combination to monomer are dependent somewhat on the amount of residual monomer permissible in the polymer products, the specific catalyst-combination, the particular monomer or monomers, the type of polymerization system, the temperatures, the time of heating, and the effect of plasticizers, emulsifying agents, diluents, etc., present in the polymerization mixtures. Although the influence of many of these factors often must be determined in each particular instance, certain generalizations may be made. For example, it may be stated as generally true that low temperatures in the first heating stage over relatively long periods may permit more efficient use of the primary catalyst, i. e., the benzoyl peroxide, so that less secondary catalyst, such as tertiary-butyl perbenzoate, etc., may be required. Moreover, the required amount of secondary catalyst may also be reduced by the use of the lowest temperatures possible in the effective range for the second heating stage over relatively long periods, thereby obtaining possibly more efficient use of the secondary catalyst than possible at higher temperatures. In addition, complete polymerization usually may be favored by a relatively high temperature at the end of the heating schedule. Thus, it is obvious that determinations of the limitations for effective ranges of catalyst ratios and catalyst-combination concentrations are difficult without specific reference to the temperatures and other conditions to be used. Moreover, the use of the low temperatures referred to above will necessitate longer heating periods, which is an important cost factor and must also be considered in determining the conditions to be applied to any particular polymerization.

In order to make easier comparisons of the catalytic efficiencies of various peroxides, peresters and perethers with each other and with various combinations of each other, equivalent weights of these compounds may be determined in the following manner. First, a determination is made of the equivalent weight of benzoyl peroxide or that weight required per unit weight of monomer to give, by a particular heating schedule, a polymer having a relative viscosity of about 2.5, e. g., from 2.40 to 2.55. Then the equivalent weight of a secondary catalyst, i. e., tertiary-butyl perbenzoate, etc., is determined which will give, from the same monomer, a polymer of the same relative viscosity by use of the same heating schedule. Thereafter, the amounts of catalyst or mixtures of catalyst to be used for such a heating schedule can be selected according to these equivalents. For example, an 80–20 mixture of benzoyl peroxide and tertiary-butyl perbenzoate contains these catalysts in respective amounts having a ratio corresponding to the ratio of 80 per cent of the equivalent weight of benzoyl peroxide to 20 per cent of the equivalent weight of tertiary-butyl perbenzoate.

As previously mentioned, a determination of the limits on operative amounts of catalysts for the process of this invention is rather difficult because of the numerous factors involved. In addition, the lower limit on the effective range for amounts of catalyst-combination necessary for the operation of this invention will vary according to the ratio of the catalysts in the combination, so that a determination of such lower limit has little meaning or value. However, in such catalyst-combinations, the ratio of equivalent weights of primary catalyst to secondary catalyst should be at least about 99–1, advantageously at least about 98–2, for practical operation. Nevertheless, as pointed out before, such lower limits on the secondary catalyst are dependent to some extent on the heating schedule employed and, in some cases, smaller amounts of secondary catalyst are sometimes permissible with longer heating in one or both of the heating stages, or with a high final temperature. From a practical viewpoint, the upper limit on the proportion of secondary catalyst is determined chiefly by the cost factor. In suspension polymerizations, however, this upper limit is also determined somewhat by the fact that the presence of the secondary catalyst in large proportions may result in poor control of the suspension polymerization and may thereby cause precipitation or lump formation through coagulation of polymer beads.

The process of this invention is especially applicable to suspension polymerization systems. In such systems considerable precaution must be taken to prevent coalescence of the globules of monomer, polymer or mixtures thereof. Such coalescence may result in the precipitation of monomer or polymer from the system. For this reason it has generally been found necessary to operate suspension polymerization systems below certain temperatures until at least a definite degree of polymerization or conversion from monomer to polymer has been effected. In the case of acrylonitrile and methacrylonitrile, the temperature is generally desirably maintained below about 80° C. until at least about 60 per cent conversion to polymer has been effected. Once the conversion has reached this stage, the temperature may be increased with considerably reduced likelihood of coalescence or precipitation. It can be understood, therefore, that the active ranges of the catalyst-combinations of this process are well suited to the requirements of suspension polymerization systems for acrylonitrile and methacrylonitrile, since the first heating stage carries the polymerization past the "sticky" phase or that phase of the polymerization at which the system is very susceptible to coalescence, and the higher temperature of the second heating stage aids in the completion of the polymerization after the possibility of coalescence has thus been reduced. Since the temperature of the second heating stage may be near or above the boiling point of acrylonitrile and methacrylonitrile, the second heating stage, or possibly both the first and second heating stages may be conducted in enclosed reactors to prevent loss of monomer.

Although the application of the present process has been especially advantageous in suspension polymerization, it is also effective in producing improvements in the polymerization of acrylonitrile and methacrylonitrile in mass, solution and emulsion systems. The difficulty in promoting substantially complete polymerization is encountered in these polymerization systems, as well as in suspension polymerization systems, and the process of this invention is used advantageously in effecting greater percentage conversion to polymer in such systems. One particular suspension polymerization of acrylonitrile with 0.16 per cent benzoyl peroxide and 0.10 per cent tertiary-butyl perbenzoate based on the weight of monomer, and a 3–7 monomer to water ratio, conducted in capped bottles agitated by a rocking mechanism while immersed in a controlled-temperature bath at 60° C. for 2 hours, 80° C. for 2 hours and 100° C. for 2 hours, gave very fine, hard polymer beads.

The suspension polymerization procedure used in the experiments discussed herein followed that described by J. M. Grim, in his copending applications, Serial Nos. 786,655, now Patent No. 2,594,913, and 786,656, now abandoned, both applications having been filed November 18, 1947, and assigned to the same assignee as the present application. This procedure involves the use of a water-insoluble metal phosphate, preferably of sub-micronic particle size, together with a very small amount of a surface-active agent. However, the present invention is not limited to such processes of suspension polymerization, but may be used with any suspension polymerization process.

Generally the lower limit for the temperature range of the first heating stage is that temperature at which the benzoyl peroxide type catalyst will promote an appreciable rate of polymerization under the influence of monomer and other peroxy compounds, and under other conditions of polymerization. The substituted benzoyl peroxides, in general, have lower decomposition temperatures than benzoyl peroxide itself and may usually be employed to good advantage in promoting polymerizations at temperatures of 25° C. or higher. It has been found that the catalyst-combinations of this invention operate satisfactorily in a temperature range of about 25°–80° C. for the first heating stage, advantageously about 50°–80° C. when benzoyl peroxide itself is used. For the second heating stage a temperature range of about 85°–125° C. has generally been found suitable. As pointed out before, however, there are numerous factors which may affect the polymerizations; and since it is, therefore, difficult to set the temperature limits without some indication of the other conditions involved, it must be understood that the temperature limits may vary somewhat according to these conditions.

Acrylonitrile and methacrylonitrile may be polymerized, according to the process of this invention, alone, in mixtures with each other, or in mixtures containing one or both and one or more other copolymerizable ethylenic compounds. It is sometimes advantageous that the acrylonitrile and methacrylonitrile be in preponderance, especially when the copolymerizable ethylenic compound is one usually slightly reluctant to copolymerize with the acrylonitrile and methacrylonitrile.

Illustrative examples of the copolymerizable ethylenic compounds which may be copolymerized with acrylonitrile and with methacrylonitrile in accordance with the practice of this invention are: vinyl aryls, such as styrene, vinyl naphthalenes, etc., and their nuclear-substitution products, for example, those having one or more of the following substituent groups, halogen, such as chloro, fluoro, etc., for example, monochloro-styrene, i. e., ortho-, meta- and para-chloro-styrenes, dichloro-styrenes, trichlorostyrenes, fluorostyrenes, vinyl chloro-naphthalene, p-chloro-p'-vinyl-diphenyl, etc., hydrocarbon groups, such as alkyl, alkenyl, aryl, arylalkyl, alkyl-aryl, cycloaliphatic, etc., for example, mono- and di-methyl-styrenes, ethyl-styrenes, isopropyl-styrenes, vinyl methyl-naphthalenes, divinyl benzenes, partial polymers of divinyl benzenes, phenyl-styrenes, phenethyl-styrenes, tolyl-styrenes, cyclohexyl-styrenes, etc., cyano, for example, mono- and dicyano-styrenes, substituted alkyl groups, such as trifluoromethyl, cyanomethyl, alkoxyalkyl, carboxyalkyl, etc., for example, trifluoromethyl-styrenes, cyanomethyl-styrenes, methoxy-methyl-styrenes, acetoxyethyl-styrenes, etc.; the vinyl halides, e. g., vinyl chloride, vinyl fluoride, the vinylidine halides, e. g., vinylidene chloride, vinylidene fluoride, etc.; the amides of acrylic, alpha-methacrylic, alpha-chloroacrylic, beta-cyanoacrylic acids, etc.; the nitrile derivatives of alpha-chloroacrylic, beta-cyanoacrylic acids, etc., e. g., alpha-chloroacrylonitrile, fumaro-nitrile, etc.; methylene-malonic esters, the mono-alkyl esters and the di-alkyl esters, e. g., the monomethyl and the dimethyl esters, the dipropyl esters, etc.; allyl derivatives, e. g., acrolein, methacrolein, allyl methyl ketone, allyl ethyl ketone, allyl chloride, allyl methyl ether, allyl ethyl ether, allyl butyl ether, allyl phenyl ether, allyl acetate, allyl propionate, allyl acrylate, methallyl acrylate, diallyl phthalate, diallyl oxalate, diallyl succinate, diallyl ether, diallyl ketone, dimethallyl ketone, etc.; acrylic, methacrylic, alpha-chloroacrylic, beta-cyano-acrylic, maleic, fumaric, citraconic esters, e. g., the methyl, ethyl, propyl, isopropyl, butyl, amyl, hexyl, chloromethyl, chloroethyl, cyclopentyl, cyclohexyl, methylcyclohexyl, benzyl, phenyl, phenethyl, chlorophenethyl, phenoxypropyl esters etc., such as, for example, methyl acrylate, ethyl acrylate, methyl methacrylate, propyl methacrylate, methyl alpha-chloro-acrylate, methyl beta-cyano-acrylate, phenyl beta-cyano-acrylate, dimethyl maleate, dimethyl fumarate, diethyl maleate, diethyl fumarate, di-isopropyl maleate, dimethyl citraconate, diethyl citraconate, etc.; vinyl ethers, e. g., divinyl ether, vinyl methyl ether, vinyl phenyl ether, etc.; vinyl ketones, e. g., divinyl ketone, vinyl methyl ketone, acrylophenone, etc. Acrylonitrile or methacrylonitrile or mixtures thereof can be copolymerized with any copolymerizable ethlenic monomer such as the above or with a mixture containing any number of such monomers.

The process of this invention has been found especially useful in the preparation of plasticized or lubricated polymers. Normally the presence of a plasticizer in a polymer causes an increase in the shrinkage and a lowering of the heat-distortion temperature. However, the improvements in these thermal properties effected by the present invention make it possible to produce plasticized or lubricated acrylonitrile and methacrylonitrile polymers having a greater resistance to shrinkage and to heat-distortion than usually found in plasticized acrylonitrile and methacrylonitrile polymers prepared with benzoyl peroxide alone.

The distinction between plasticizers and lubricants for polymers is not always very clear. Generally plasticizers have more of a solvent or softening effect on polymers and cause greater changes in the physical properties, e. g., ductility, flexibility and impact strength, than lubricants do. On the other hand, lubricants are used to improve the ease of molding and to aid mold release. Since there is considerable overlapping of the particular function of a great many compounds used to promote ease of flow, and in order to facilitate reference to these compounds, the term "plasticizer" is used broadly hereinafter to include both plasticizers and lubricants.

Various types of plasticizers are suitable for use in the practice of this invention. Included among these are: fatty acid ester plasticizers, such as butyl stearate, beta-butoxyethyl stearate, methyl oleate, amyl oleate, cyclohexyl stearate; esters of dicarboxylic aliphatic acids, such as dicapryl sebacate, etc.; aryl ether and ester plasticizers such as dimethyl phthalate, dibutyl phthalate, diamyl phthalate, dibenzyl maleate, beta-phenoxy-ethyl benzoate, beta-(3-chloro-2-xenoxy)-ethyl levulinate, beta-ethoxy ethyl 2-chloro-phenoxy acetate, beta-butoxy-ethyl phenoxy-acetate diaryl ether derivatives such as chlorinated diphenyl ether and cyclohexyl chlorinated diphenyl ether, aryloxyalkyl fumarates, such as beta-phenoxyethyl fumarate, triaryl phosphates, 1,3 - di - (4 - tertiary - butyl - phenoxy)-isobutane, ethyl lactate salicylate, styrene glycol diesters, etc.; chlorinated hydrocarbon plasticizers such as chlorinated waxes, chlorinated diphenyl, chlorinated naphthalene, 1,2-bis(4-chlorophenyl) ethane; and various other types of plasticizers which are compatible with acrylonitrile and methacrylonitrile polymers and which do not act to inhibit or appreciably retard the polymerization. The amount of plasticizer to be added usually depends on a number of factors, which include the efficiency of the particular plasticizer, the degree of plasticity desired, etc. In general, however, at least about 0.2–0.5 per cent plasticizer is added before any noted change in flow or plasticity is accomplished.

What is claimed is:

1. The process of polymerizing a polymerizable mass containing a compound of the class consisting of acrylonitrile and methacrylonitrile as the only polymerizable constituent thereof, intimately mixed with a catalyst-combination consisting of tertiary butyl perbenzoate and a benzoyl peroxide of the class consisting of benzoyl peroxide and its chloro, bromo, fluoro, alkoxy, alkyl, benzo and carboperoxy nuclear-substituted derivatives, by heating the polymerizable mass at a temperature between about 25° C. and about 80° C. until at least about 60 per cent conversion to polymer has been effected, and subsequently at a temperature between about 85° C. and about 125° C. until substantially complete polymerization has been effected.

2. The process of polymerizing a polymerizable mass containing a compound of the class consisting of acrylonitrile and methacrylonitrile as the only polymerizable constituent thereof, intimately mixed with a catalyst-combination consisting of benzoyl peroxide and tertiary-butyl perbenzoate by heating the polymerizable mass at a temperature between about 25° C. and about 80° C. until at least about 60 per cent conversion to polymer has been effected, and subsequently at a temperature between about 85° C. and about 125° C. until substantially complete polymerization has been effected.

3. The process of claim 2, in which the polymerization is conducted in a suspension polymerization system.

4. The process of claim 2, in which the polymerization mixture also contains a plasticizer.

5. The process of claim 2, in which the polymerization is conducted in a suspension polymerization system and the polymerization mixture also contains a plasticizer.

6. The process of polymerizing a polymerizable mass containing acrylonitrile as the only polymerizable constituent thereof intimately mixed with a catalyst-combination consisting of benzoyl peroxide and tertiary-butyl perbenzoate by heating the polymerizable mass at a temperature between about 25° C. and about 80° C. until at least about 60 per cent conversion to polymer has been effected, and subsequently at a temperature between about 85° C. and about 125° C. until substantially complete polymerization has been effected.

7. The process of polymerizing a polymerizable mixture containing methacrylonitrile as the only polymerizable constituent thereof and a catalyst-combination consisting of benzoyl peroxide and tertiary-butyl perbenzoate by heating the polymerization mixture at a temperature between about 25° C. and about 80° C. until at least about 60 per cent conversion to polymer has been effected, and subsequently at a temperature between about 85° C. and about 125° C. until substantially complete polymerization has been effected.

8. The process of claim 6 in which the polymerization is conducted in a suspension polymerization system.

9. The process of claim 7, in which the polymerization is conducted in a suspension polymerization system.

GAETANO F. D'ALELIO.

References Cited in the file of this patent

UNITED STATES PATENTS

| Number | Name | Date |
|---|---|---|
| 2,426,476 | Vaughan et al. | Aug. 26, 1947 |
| 2,426,719 | Watkins | Sept. 2, 1947 |
| 2,444,655 | Kroeker et al. | July 6, 1948 |
| 2,455,569 | Dickey | Dec. 7, 1948 |
| 2,504,082 | Neher et al. | Apr. 11, 1950 |
| 2,519,135 | Jacobson | Aug. 15, 1950 |

FOREIGN PATENTS

| Number | Country | Date |
|---|---|---|
| 604,544 | Great Britain | July 6, 1948 |

OTHER REFERENCES

Perry et al., article in "Modern Plastics," November 1947, pages 134–136, 216, 218, 220, and 222.